US008108899B2

(12) United States Patent
Shoff et al.

(10) Patent No.: US 8,108,899 B2
(45) Date of Patent: Jan. 31, 2012

(54) INTERACTIVE ENTERTAINMENT SYSTEM FOR PRESENTING SUPPLEMENTAL INTERACTIVE CONTENT TOGETHER WITH CONTINUOUS VIDEO PROGRAMS

(75) Inventors: Daniel J. Shoff, Issaquah, WA (US); Valerie L. Bronson, Bellevue, WA (US); Joseph H. Matthews, III, Redmond, WA (US); Frank A. Lawler, Seattle, WA (US)

(73) Assignee: Microsoft Corporation, Redmond, WA (US)

( * ) Notice: Subject to any disclaimer, the term of this patent is extended or adjusted under 35 U.S.C. 154(b) by 1273 days.

(21) Appl. No.: 10/832,765

(22) Filed: Apr. 26, 2004

(65) Prior Publication Data

US 2004/0210824 A1    Oct. 21, 2004

Related U.S. Application Data

(60) Division of application No. 09/349,638, filed on Jul. 8, 1999, which is a continuation of application No. 08/623,610, filed on Mar. 29, 1996, now Pat. No. 6,240,555.

(51) Int. Cl.
*H04N 7/10* (2006.01)
(52) U.S. Cl. ............................ 725/52; 725/51; 725/53
(58) Field of Classification Search ...................... 725/51
See application file for complete search history.

(56) References Cited

U.S. PATENT DOCUMENTS 4,081,754 A    3/1978    Jackson
4,203,130 A    5/1980    Doumit et al.
(Continued)

FOREIGN PATENT DOCUMENTS

EP    0128481 A2    12/1984
(Continued)

OTHER PUBLICATIONS

DiRosa, "BIGSURF Netguide", vol. 3.1, Jul. 1995, pp. 1-27.
(Continued)

*Primary Examiner* — Brian Pendleton
*Assistant Examiner* — Jean D Saint Cyr
(74) *Attorney, Agent, or Firm* — Lee & Hayes, PLLC

(57) ABSTRACT

An interactive entertainment system enables presentation of supplemental interactive content along side traditional broadcast video programs, such as television shows and movies. The programs are broadcast in a conventional manner. The supplemental content is supplied as part of the same program signal over the broadcast network, or separately over another distribution network. A viewer computing unit is located at the viewer's home to present the program and supplemental content to a viewer. When the viewer tunes to a particular channel, the viewer computing unit consults an electronic programming guide (EPG) to determine if the present program carried on the channel is interactive. If it is, the viewer computing unit launches a browser. The browser uses a target specification stored in the EPG to activate a target resource containing the supplemental content for enhancing the broadcast program. The target resource contains display layout instructions prescribing how the supplemental content and the video content program are to appear in relation to one another when displayed. When the data from the target resource is downloaded, the viewer computing unit is responsive to the layout instructions obtained from the target resource to display the supplemental content concurrently with the video content program. Embedding the layout instructions in the supplemental content advantageously places control of the presentation to the content developers. The developers are free to arrange the data and video in any manner they choose.

19 Claims, 11 Drawing Sheets

U.S. PATENT DOCUMENTS

| | | | |
|---|---|---|---|
| 4,228,543 A | 10/1980 | Jackson | |
| 4,694,490 A | 9/1987 | Harvey et al. | |
| 4,704,725 A | 11/1987 | Harvey et al. | |
| 4,706,121 A | 11/1987 | Young | |
| 4,751,578 A | 6/1988 | Reiter et al. | |
| 4,908,713 A | 3/1990 | Levine | |
| 4,977,455 A | 12/1990 | Young | |
| 5,038,211 A | 8/1991 | Hallenbeck | |
| 5,047,867 A | 9/1991 | Strubbe et al. | |
| 5,068,734 A | 11/1991 | Beery | |
| 5,151,789 A | 9/1992 | Young | |
| 5,223,924 A | 6/1993 | Strubbe | |
| 5,233,654 A | 8/1993 | Harvey et al. | |
| 5,307,173 A | 4/1994 | Yuen et al. | |
| 5,329,389 A | 7/1994 | Nishida et al. | |
| 5,335,079 A | 8/1994 | Yuen et al. | |
| 5,335,277 A | 8/1994 | Harvey et al. | |
| 5,353,121 A | 10/1994 | Young et al. | |
| 5,382,983 A | 1/1995 | Kwoh et al. | |
| 5,394,163 A | 2/1995 | Bullen et al. | |
| 5,410,344 A | 4/1995 | Graves et al. | |
| 5,469,206 A | 11/1995 | Strubbe et al. | |
| 5,479,266 A | 12/1995 | Young et al. | |
| 5,479,268 A | 12/1995 | Young et al. | |
| 5,483,278 A | 1/1996 | Strubbe et al. | |
| 5,524,193 A | 6/1996 | Covington et al. | |
| 5,532,754 A | 7/1996 | Young et al. | |
| 5,534,911 A | 7/1996 | Levitan | |
| 5,541,662 A | 7/1996 | Adams et al. | |
| 5,546,527 A | 8/1996 | Fitzpatrick et al. | |
| 5,552,833 A | 9/1996 | Henmi et al. | |
| 5,559,549 A * | 9/1996 | Hendricks et al. | 725/50 |
| 5,563,648 A | 10/1996 | Menand et al. | |
| 5,570,126 A | 10/1996 | Blahut et al. | |
| 5,572,643 A | 11/1996 | Judson | |
| 5,583,560 A | 12/1996 | Florin et al. | |
| 5,583,576 A | 12/1996 | Perlman et al. | |
| 5,585,865 A | 12/1996 | Amano et al. | |
| 5,585,866 A | 12/1996 | Miller et al. | |
| 5,589,892 A | 12/1996 | Knee et al. | |
| 5,594,228 A | 1/1997 | Swartz et al. | |
| 5,594,509 A | 1/1997 | Florin et al. | |
| 5,604,542 A | 2/1997 | Dedrick | |
| 5,606,691 A | 2/1997 | Watts et al. | |
| 5,617,565 A | 4/1997 | Augenbraun et al. | |
| 5,623,613 A | 4/1997 | Rowe et al. | |
| 5,629,733 A | 5/1997 | Youman et al. | |
| 5,635,989 A | 6/1997 | Rothmuller | |
| 5,657,091 A | 8/1997 | Bertram | |
| 5,675,390 A | 10/1997 | Schindler et al. | |
| 5,682,511 A | 10/1997 | Sposato et al. | |
| 5,686,954 A | 11/1997 | Yoshinobu et al. | |
| 5,687,331 A | 11/1997 | Volk et al. | |
| 5,689,799 A | 11/1997 | Dougherty et al. | |
| 5,692,214 A | 11/1997 | Levine | |
| 5,694,163 A | 12/1997 | Harrison | |
| 5,694,546 A * | 12/1997 | Reisman | 705/26 |
| 5,708,845 A | 1/1998 | Wistendahl et al. | |
| 5,710,887 A | 1/1998 | Chelliah et al. | |
| 5,724,424 A | 3/1998 | Gifford | |
| 5,727,065 A | 3/1998 | Dillon | |
| 5,731,844 A | 3/1998 | Rauch et al. | |
| 5,734,413 A | 3/1998 | Lappington et al. | |
| 5,737,560 A | 4/1998 | Yohanan | |
| 5,737,619 A * | 4/1998 | Judson | 715/236 |
| 5,751,282 A | 5/1998 | Girard et al. | |
| 5,752,159 A | 5/1998 | Faust et al. | |
| 5,758,259 A | 5/1998 | Lawler | |
| 5,761,606 A | 6/1998 | Wolzien | |
| 5,774,664 A | 6/1998 | Hidary et al. | |
| 5,774,666 A | 6/1998 | Portuesi | |
| 5,778,181 A | 7/1998 | Hidary et al. | |
| 5,781,189 A | 7/1998 | Holleran et al. | |
| 5,781,228 A | 7/1998 | Sposato | |
| 5,781,246 A | 7/1998 | Alten et al. | |
| 5,801,747 A | 9/1998 | Bedard | |
| 5,805,806 A | 9/1998 | McArthur | |
| 5,818,441 A | 10/1998 | Throckmorton et al. | |
| 5,818,935 A | 10/1998 | Maa | |
| 5,828,419 A | 10/1998 | Bruette et al. | |
| 5,838,906 A | 11/1998 | Doyle et al. | |
| 5,845,303 A | 12/1998 | Templeman | |
| 5,848,352 A | 12/1998 | Dougherty et al. | |
| 5,860,073 A | 1/1999 | Ferrel et al. | |
| 5,861,881 A | 1/1999 | Freeman et al. | |
| 5,867,226 A | 2/1999 | Wehmeyer et al. | |
| 5,873,080 A | 2/1999 | Coden et al. | |
| 5,878,233 A * | 3/1999 | Schloss | 709/225 |
| 5,883,677 A * | 3/1999 | Hofmann | 348/584 |
| 5,884,056 A | 3/1999 | Steele | |
| 5,892,508 A | 4/1999 | Howe et al. | |
| 5,905,865 A | 5/1999 | Palmer et al. | |
| 5,907,321 A | 5/1999 | Grossman et al. | |
| 5,907,837 A | 5/1999 | Ferrel et al. | |
| 5,918,012 A | 6/1999 | Astiz et al. | |
| 5,953,046 A | 9/1999 | Pocock | |
| 5,978,817 A | 11/1999 | Giannandrea et al. | |
| 5,990,927 A * | 11/1999 | Hendricks et al. | 725/132 |
| 6,005,565 A | 12/1999 | Legall et al. | |
| 6,006,257 A | 12/1999 | Slezak | |
| 6,025,837 A | 2/2000 | Matthews, III et al. | |
| 6,133,909 A | 10/2000 | Schein et al. | |
| 6,177,931 B1 * | 1/2001 | Alexander et al. | 725/52 |
| 6,215,531 B1 | 4/2001 | Beery | |
| 6,216,264 B1 | 4/2001 | Maze et al. | |
| 6,240,555 B1 | 5/2001 | Shoff et al. | |
| 6,305,020 B1 | 10/2001 | Hoarty et al. | |
| 6,359,636 B1 | 3/2002 | Schindler et al. | |
| 6,486,895 B1 | 11/2002 | Robertson et al. | |
| 6,532,589 B1 | 3/2003 | Proehl et al. | |
| 6,631,523 B1 | 10/2003 | Matthews, III et al. | |
| 6,668,377 B1 | 12/2003 | Dunn | |
| 6,963,906 B2 * | 11/2005 | Portuesi | 709/217 |
| 7,032,185 B1 | 4/2006 | Yohanan | |
| 2003/0001895 A1 | 1/2003 | Celik | |
| 2003/0084444 A1 | 5/2003 | Ullman et al. | |
| 2003/0101232 A1* | 5/2003 | Ullman et al. | 709/217 |
| 2007/0220107 A1* | 9/2007 | Reisman | 709/217 |
| 2008/0235725 A1* | 9/2008 | Hendricks | 725/35 |

FOREIGN PATENT DOCUMENTS

| | | |
|---|---|---|
| EP | 0572090 A2 | 12/1993 |
| EP | 0 705 036 A2 | 4/1996 |
| EP | 0 721 253 A2 | 7/1996 |
| EP | 0 723 369 A1 | 7/1996 |
| EP | 0 735 749 A2 | 10/1996 |
| EP | 0 757 485 A2 | 2/1997 |
| EP | 0 758 833 A2 | 2/1997 |
| EP | 0 774 866 A2 | 5/1997 |
| EP | 0 774 868 A1 | 5/1997 |
| EP | 0 735 749 A3 | 9/1997 |
| EP | 0 758 833 A3 | 10/1997 |
| EP | 0 854 645 A2 | 7/1998 |
| JP | 63211010 | 9/1988 |
| JP | 2093767 A | 4/1990 |
| JP | 5089173 A | 9/1993 |
| JP | 06124309 | 5/1994 |
| JP | 6507037 | 8/1994 |
| JP | 6276501 A | 9/1994 |
| JP | 0773243 | 3/1995 |
| JP | 7160732 | 6/1995 |
| JP | 06216168 | 9/1995 |
| JP | 7234881 | 9/1995 |
| JP | 7303216 | 11/1995 |
| JP | 7303216 A | 11/1995 |
| JP | 8019063 A | 1/1996 |
| JP | 08051595 | 2/1996 |
| JP | 8249324 | 9/1996 |
| JP | 8275077 A | 10/1996 |
| JP | 8314920 | 11/1996 |
| JP | 07193666 | 2/1997 |
| JP | 9046689 | 2/1997 |
| JP | 9083888 A | 3/1997 |
| JP | 09203509 | 4/1998 |
| JP | 7297796 A | 1/2009 |
| WO | WO 94/14284 | 6/1994 |
| WO | WO 96/17473 | 6/1996 |

| | | |
|---|---|---|
| WO | WO 96/41470 | 12/1996 |
| WO | WO 97/02702 | 1/1997 |
| WO | WO 97/30546 | 8/1997 |
| WO | WO 97/46011 | 12/1997 |
| WO | WO 97/48230 | 12/1997 |
| WO | WO 98/43183 | 10/1998 |

OTHER PUBLICATIONS

Shibano, "The SQL-92 Follow on and the SQL, Information Processing", Information Processing Society of Japan, Jul. 15, 1996, vol. 37, No. 7, pp. 616-622.

Connolly, Hypertext Markup Language—2.0, RFC 1866, Nov. 1995, MIT/W3C.

PR Newswire, "Iguide Debuts TV Guide Online Centerpiece", Mar. 1996, 1 page.

Eric Schmuckler et al., "A marriage that's made in cyberspace. (television networks pursue links with online information services)", May 16, 1994, Mediaweek, 4 pages.

"Prodigy launches interactive TV listing", Apr. 22, 1994, Public Broadcasting Report, abstract.

"Prodigy offers total television online guide", Apr. 12, 1994, Media Daily, abstract.

"Prodigy launched Interactive TV listing service on computer network", Apr. 12, 1994, Communications Daily, abstract.

Untitled Article, Apr. 18, 1994, Television Digest, abstract.

"Intercast Industry Group Web Page"; retrieved from World Wide Web at web site URL www.intercast.org.

Mark Berniker, "TV Guide' going online", Broadcasting & Cable, Jun. 1994, 2 pages.

Robert Cowart, "Mastering Windows 3.1 Special Edition", 1993, pp. 84-87.

Loeb, Shoshana, "Architecting Personalized Delivery of Multimedia Information," Journal of the ACM, Association for Computing Machinery, New York, NY, US, vol. 35, No. 12, Dec. 1992, pp. 39-48.

Ehrmantraut, Michael, "The Personal Electronic Program Guide—Towards the Pre-Selection of Individual TV Programs," Proceedings of the International Conference on Information and Knowledge Management CIKM, ACM, New York, NY, US, Nov. 12, 1996, pp. 243-250.

"HP Division Talks to Shops About Video Box", Voight et al., AdWeek Midwest, v XXXVI, n. 48, p. 34, Nov. 27, 1995.

"Writhing in the city of New Orleans", Burgi et al., Mediaweek, v4,n22, p20(4), May 30, 1994.

Kita, Mitsunari, "From the Scene of Using the Internet for Business/ The Internet TV Guide,"Internet Magazine, No. 23, pp. 288-291, Impress, Inc., Japan, Dec. 1, 1996.

U.S. Appl. No. 07/991,074, Dec. 9, 1992, Hendricks.

* cited by examiner

| STORAGE POINTER | TITLE | ACTOR | CC | STEREO | TIME | NETWORK | SUPPLEMENTAL CONTENT | DESCRIPTION |
|---|---|---|---|---|---|---|---|---|
| PROG1 | MURDER, SHE WROTE | LANDSBURY | YES | YES | 8:00 PM THURSDAY | CBS | CONTENT1 | "The Secret of Gila Junction" Jessica... |
| PROG2 | SEINFELD | SEINFELD | YES | YES | 9:00 PM THURSDAY | NBC | http://www.nbc.com/ seinfeld.html | "The Friars Club" Jerry tries.... |
| PROG3 | STAR TREK NEXT GEN. | STEWART | YES | YES | 10:00 PM FRIDAY | FOX | http://www.fox.com/ startrek.html http://www.collectiecollectables.html | "Delta Vega" Picard is faced..... |

Fig. 3

INTERACTIVE ENTERTAINMENT SYSTEM FOR PRESENTING SUPPLEMENTAL INTERACTIVE CONTENT TOGETHER WITH CONTINUOUS VIDEO PROGRAMS

RELATED APPLICATIONS

This is a divisional of U.S. patent application Ser. No. 09/349,638, filed, Jul. 8, 1999, which is a continuation of Ser. No. 08/623,610, now U.S. Pat. No. 6,240,555, filed Mar. 29, 1996.

TECHNICAL FIELD

This invention relates to interactive entertainment systems, such as interactive television or interactive computing network systems. More particularly, this invention relates to methods for presenting supplemental interactive content in conjunction with continuous video programs to enable viewer interactivity with the otherwise non-interactive video programs.

BACKGROUND OF THE INVENTION

Video content programs, such as TV shows and pay-per-view movies, are delivered to a viewer as a continuous data stream. Today, programs are most commonly distributed using a wireless broadcast system, or a cable system. In the first instance, the programs are broadcast over a wireless network and received at individual homes through an antenna or satellite dish. In the latter case, the programs are transmitted over cable to set-top boxes resident in the viewers' homes.

In broadcast distribution systems, there is no opportunity for interactive control of the content by the viewer. The viewer simply has an option to watch the program, change to a different program, or turn off the television. However, as consumers have learned from playing video games on their televisions, non-interactive viewing is not nearly as fun or sensory rich as interactive entertainment.

To enhance the traditional way of viewing television, there has been some effort toward the production of interactive programming content. As presently contemplated, additional interactive content is created to enhance the existing traditional program. This supplemental content is played along with the continuous video stream to enable viewers to interact with the program in a more involved manner than simply watching it. The supplemental content might, for example, ask the viewer questions about the episode, or play games with the viewer that relate to the show, or describe behind-the-scenes aspects of making the program. However, there remains a significant hurdle concerning how to create and distribute interactive programs.

Apart from the TV environment, however, computer users are familiar with interactive content on their computers. Many users own interactive multimedia CD-ROM applications that combine video, audio, pictures, text, and other content into a rich and responsive presentation. Familiar examples of interactive computer applications include games (e.g., Myst from Broderbund), educational programs (e.g., Reader Rabbit series from the Learning Company or Magic Schoolbus series from Microsoft), and home entertainment (e.g., Encarta from Microsoft).

Interactive content is also available from online services over a public network. Most notably, the Internet is emerging as a means for supplying video, sound, pictures, text, and other multimedia rich resources to a user's computer. Through the Internet, users can access a wide variety of resources that are maintained on computers located around the world.

Resources available on the Internet are most commonly presented as hypertext. "Hypertext," also referred to as "hypermedia," is a metaphor for presenting information in which text, images, sounds, and actions become linked together in a complex, non-sequential web of associations that permit a user to browse through related topics, regardless of the presented order of the topics. Hypermedia content is widely used for navigation and information dissemination on the "World-Wide Web" (WWW or Web) of the Internet. An application program referred to as a "Web browser" is normally used to retrieve and render hypermedia content from the WWW.

Despite the development of interactive entertainment in the computer sector, there has been little activity spilling over into the traditional television world. The TV environment poses a problem in that the programs are typically delivered as a broadcast of a continuous data stream, which inherently does not support interactive control. Interlacing interactive content presents a difficult design issue.

One proposed solution is a technology referred to as "Intercast technology" which is available from the Intercast Industry Group, a consortium of leading television networks, program hardware vendors, and software vendors. The Intercast technology presents both television programs and Internet data together on the same television or computer monitor, but with separate and predefined panes.

FIG. 1 shows a screen 14 (television or computer monitor) which illustrates the Intercast technology. The screen 14 is divided into panes, as represented by panes 16-18. Pane 16 contains the television program resulting from the video data. Pane 17 contains a hypermedia document, such as a Web page, that is provided by the Internet data. A third pane 18 can be used to show additional data, such as advertisements or the like.

The Internet data is combined with the video data of the television program to form a single signal that is broadcast to the viewer. The Internet data is transmitted during the vertical blank interval (VBI) between successive frames of the video data. The Internet data and video data are separated at the viewer's computer and presented simultaneously within their respective panes.

The drawback with the Intercast technology is that it rigidly adheres to the paned presentation. The television pane 16 is a self-contained pane which is dedicated to showing only the video program, and the Web pane 17 is a separately self-contained pane which is reserved exclusively for Web content. Content providers who develop the Internet data have no control over how the television program and interactive supplemental content is presented to the viewer. They can simply control how the data is presented within its own box 17. Accordingly, the content providers are significantly limited in what they can create in the way of a full interactive media event.

The inventors have developed a better way of creating and distributing interactive programming that frees the content providers of these restrictions.

SUMMARY OF THE INVENTION

This invention concerns an interactive entertainment system for supplying interactive supplemental content along with continuous video content programs to viewers. The programs are supplied from a program provider, such as a cable headend or a broadcast station, over a distribution network to a viewer computing unit. The programs are continuous, non-interactive data streams, such as television shows, movies, or other video content.

The viewer computing unit is implemented as a television, a television/set-top box unit, a personal computer, or the like. It has a processor and memory. An electronic programming guide (EPG) is stored in the memory and executable on the processor to organize programming information that is descriptive of the video content programs. The EPG maintains a data field that indicates whether the video content program is interactive. The EPG data field contains a pointer, universal resource locator, or other target specification to the target resource that supports the interactive content and correlates this data field with the particular program that the supplemental content is designed to enhance. Accordingly, if a target resource is listed in conjunction with a particular program, the program is recognized as being interactive. The supplemental content can be developed and provided by the same provider that distributes the video content program, or by an independent service provider.

When the viewer tunes to a particular channel, the viewer computing unit is consults the EPG to determine if the present program is interactive. If it is, the viewer computing unit launches an interactive support module, such as an Internet browser. This browser is kept in memory and is dynamically loadable for execution on the processor when the viewer tunes to a channel carrying a video content program that the EPG identifies as interactive. The viewer computing unit also depicts a small icon or other indicia to alert the viewer that the program is interactive. The viewer can click on or otherwise activate the icon to enter the interactive mode and display the supplemental content. As an alternative, the supplemental content can be automatically displayed in response to launching the Internet browser.

The Internet browser uses the target specification in the EPG to start the target resource. The target resource contains the supplemental content to enhance the television program. The supplemental content might be, for example, questions about the program, games, trivia information, facts about the actors and producers, information on other episodes, advertisements, a listing of products or memorabilia about the program, and so on. The supplemental content and program can be transmitted together as a single signal, which is separated at the viewer computing unit, or separately over two channels or two different networks.

The target resource also contains display layout instructions prescribing how the supplemental content and the video content program are to appear in relation to one another when displayed on the television or monitor. When the data from the target resource is downloaded to the viewer computing unit, the processor is responsive to the layout instructions obtained from the target resource to display the supplemental content concurrently with the video content program.

Embedding the layout instructions in the supplemental content advantageously returns control of the presentation to the content developers. The developers can now arrange the data and video in any manner they choose. The developers are not restricted to specific fixed panes, as in the prior art.

BRIEF DESCRIPTION OF THE DRAWINGS

FIG. 3 is a simplified example of data fields in a data structure maintained by an electronic programming guide.

DETAILED DESCRIPTION OF THE PREFERRED EMBODIMENT

Figure 1:
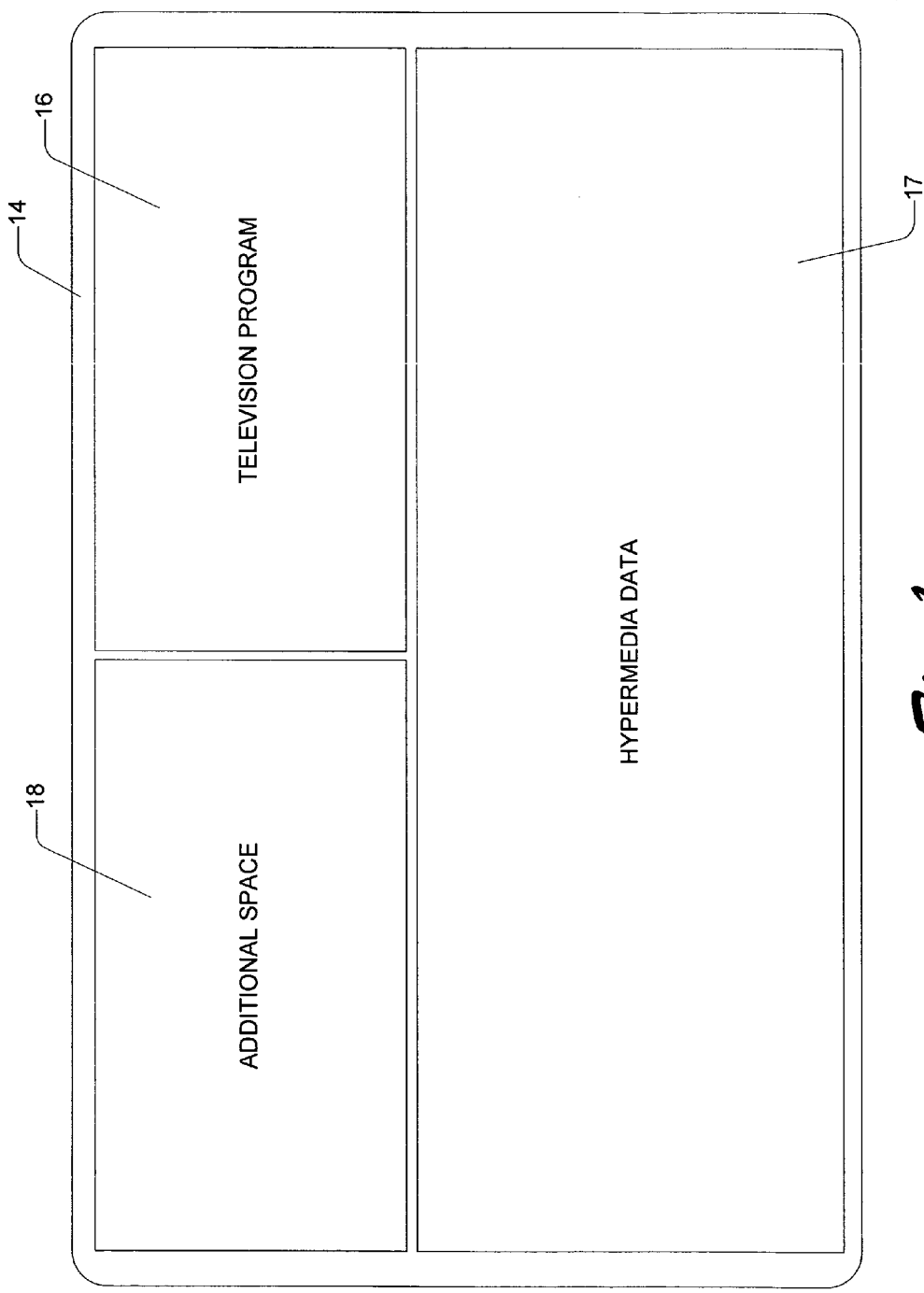
FIG. 1 is an illustration of a screen showing a paned presentation format for presenting television programs and Internet data according to prior art Intercast technology.
Figure 2:
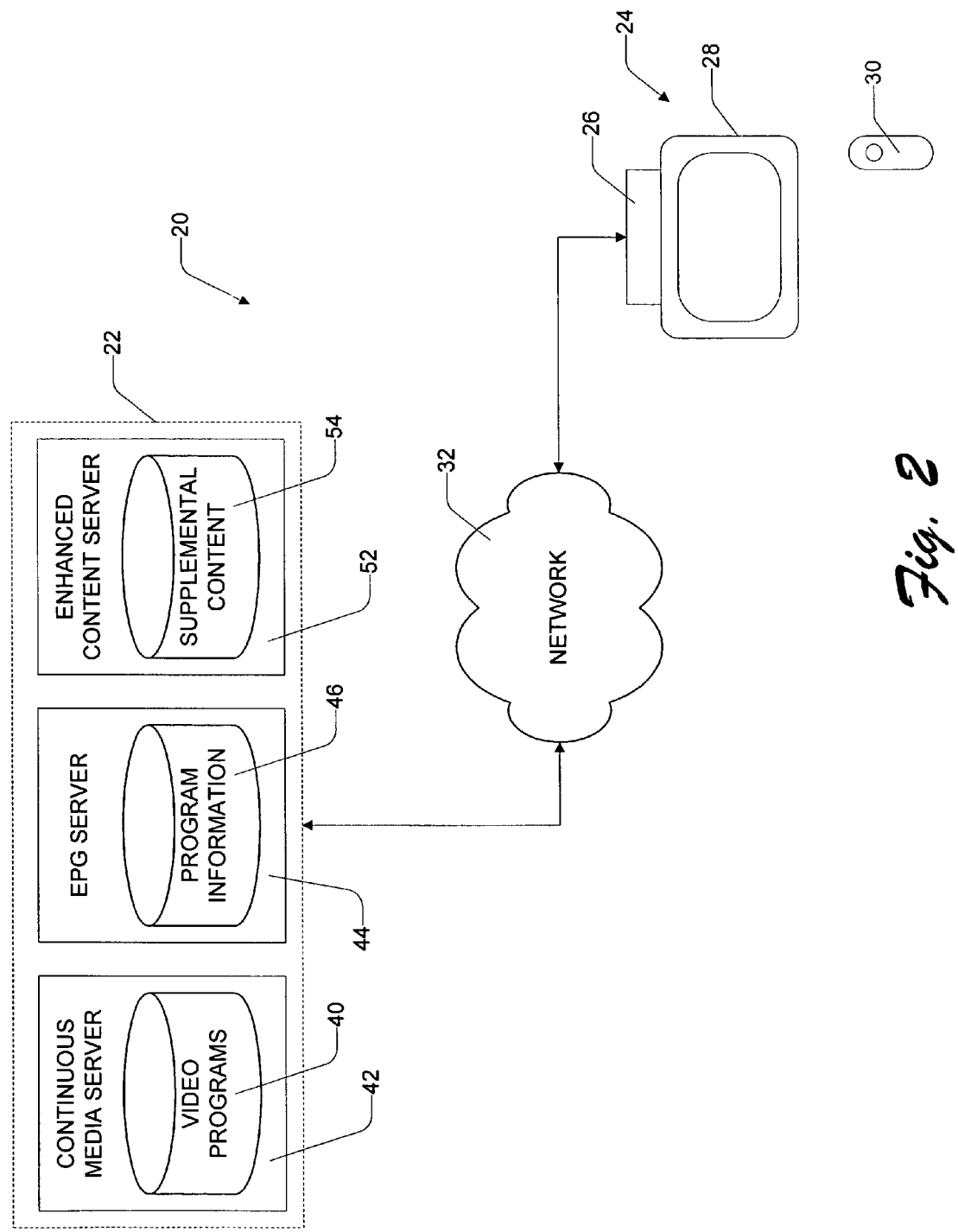
FIG. 2 is a diagrammatic illustration of an interactive entertainment system according to one implementation. The FIG. 2 implementation is representative of an interactive TV system.

FIG. 2 shows an interactive entertainment system 20 implemented as an interactive television (ITV) system. System 20 includes a centralized headend 22 which is configured to provide continuous video content programs to multiple subscribers. These programs might include traditional broadcast TV shows, movies, games, and the like. The programs are transmitted as a continuous data stream, which is non-interactive in itself.

Each subscriber has a viewer computing unit 24. In the illustrated implementation, the viewer computing unit is embodied as a set-top box (STB) 26 coupled to a television (TV) 28. The STB 26 receives digital video signals from headend 22 and controls which programs are displayed on the TV 28. The STB 26 is controlled by the viewer through use of a panel control located on its face, or a hand held remote control unit 30. Instead of a separate STB, however, a viewer computing unit can be incorporated in the TV itself. In addition to televisions, the viewer computing unit might be implemented with other types of visual display units, such as a computer monitor, as is described below with respect to the FIG. 4 implementation.

Each viewer computing unit 24 is configured to run an electronic program guide (EPG). The EPG provides an on-screen listing of various programs or program titles. The listing is organized in a predetermined arrangement that is displayed on the television. The EPG might also include other program descriptive information, including whether the program is provided in closed caption or stereo.

Headend 22 is interconnected to the subscribers via a distribution structure or network 32. The distribution structure 32 can be implemented in different ways. One implementation is a multi-tier network which includes a high-speed, high-bandwidth fiber optic cable network between the headend and regional distribution nodes (not shown), and conventional home entry lines, such as twisted-pair lines or coaxial cable, between the distribution nodes and viewer computing units. Other implementations include satellite communications (e.g., DSS technologies), RF communication, or other wireless technologies. Moreover, the network can be constructed using a combination of wireless and wire-based technologies.

In the illustrated implementation, the network 32 provides both the pipeline for distribution of programs from the headend to the subscriber, as well as a back channel which enables communication from the subscriber to the headend. The back channel permits the viewer to send requests and instructions to the headend to facilitate interactive control.

Headend 22 provides video content programs to the viewer computing unit 24. The programs are embodied as video data streams that are transmitted from headend 22 over distribution structure 32 to the viewer computing unit. The headend maintains a database of programs 40 that can be served by a continuous media server 42 to individual viewers in an on-demand mode. The headend can 11 also retransmit to its subscribers broadcast video signals that it receives from another source, such as a satellite feed or another cable system. The video data streams are sent to the viewer computing units in digital or analog format.

An EPG server 44 is provided at headend 22 to serve the programming information needed by the EPG at the viewer computing unit 24. The EPG server 44 is implemented as a structured query language (SQL) database 46 with records containing information relating to available shows or programs.

The headend 22 further includes an enhanced content server 52 which serves supplemental interactive content to the viewer computing units to enhance or supplement the continuous video streams served by the continuous media server 42. The supplemental content is stored digitally in database 54 and can be text, graphics, video, picture, sound, or other multimedia types. Examples of supplemental content include trivia questions or games related to the program, advertisements, merchandise or other memorabilia, hyperlinks to similar programs of similar type or starring the same actor/actress, and so on.

In the implementation described herein, the supplemental content is constructed as a hypertext file which is rendered by a browser. Hypertext, or hypermedia, is a metaphor for presenting information in which text, images, sounds, and actions become linked together in a complex, non-sequential web of associations that permit a user to browse through related topics, regardless of the presented order of the topics. Hypermedia content is widely used for navigation and information dissemination on the "World-Wide Web" (WWW or Web) of the Internet.

Hypermedia content is commonly organized as documents with embedded control information. The embedded control information includes formatting It specifications, indicating how a document is to be rendered by the browser. In addition, such control information can include links or "hyperlinks," which are symbols or instructions telling the browser where to find other related documents on the Internet. A hyperlink includes a label, which is typically rendered as a graphical icon or as highlighted keywords, and an underlying target specification. The target specification is set forth in the underlying hypermedia document, but is normally invisible to the user. The target specification unambiguously identifies a targeted document or resource, specifying the name of the computer on which the document resides and the complete file name of the document.

In concept, the target resource can be virtually any type of object-including executable programs, text or multimedia documents, sound clips, audio segments, still images, computers, directories, and other hyperlinks. In WWW documents, hyperlink targets are most often files that can reside on any computers connected to the Internet. However, a hyperlink target can also be a particular location within a document, including the document that is currently being rendered. Hypertext usage is not limited to the Internet. Various multimedia applications utilize hypertext to allow users to navigate through different pieces of information content.

FIG. 3 shows an example data structure 48 which is used by the EPG database 46 to organize programming information and to correlate target specifications with the programs. The data structure includes a number of data records comprising various data fields 50 for holding programming information. The data fields contain program titles, actor names, whether the program has closed captioning or stereo audio, the scheduled time of the program, the network name, and description text. Each program record in the data structure 48 also holds pointers to storage locations within the continuous media server 42 which hold the video data streams of the programs corresponding to the program records.

The data structure 48 includes a data field 58 for holding target specifications which reference target resources supporting the supplemental content. The data structure correlates the target specifications with the programs by associating them within the same program record. The presence of a target specification within the data field 58 indicates that the associated program is interactive and that complementary content can be displayed in addition to the program itself. The target specification can be implemented in different forms. The target specification to the supplemental content stored at the headend which enhances the "Murder, She Wrote" program is in the form of a pointer "CONTENT1." The presence of this pointer in field 58 indicates that the program "Murder, She Wrote" is interactive compatible and that the supplemental content resides at a memory location identified by the pointer "CONTENT1." Similarly, the programs "Seinfeld" and "Star Trek" are interactive compatible and have associated supplemental content which are located by the hyperlink URLs in corresponding data field 58. These URLs reference resources provided by independent service providers (described below with reference to FIG. 4).

A URL (universal resource locator) is a type of target specification used in WWW documents to describe everything about a particular resource that a browser needs to know to request and render it. The URL describes the protocol a browser should use to retrieve the resource, the name of the computer it is on, and the path and file name of the resource.

The following is an example of a URL listed in the EPG data structure 48 in association with the "Seinfeld" program:
http://www.nbc.com/seinfeld The "http://" portion of the URL describes the protocol. The letters "http" stand for HyperText Transfer Protocol, the set of rules that a browser will follow to request a document and the remote server will follow to supply the document. The "www.nbc.com" portion of the URL is the name of the remote host computer which maintains the document. The last portion "/seinfeld" is the path and file name of the document on the remote host computer.

The development of the EPG data structure 48 includes designating separate data fields 50 within a storage medium for holding programming information, and dedicating at least one of the data fields 58 to storing target specifications to supplemental content. The target specifications can be in the form of memory pointers, hyperlinks, URLs, or any other designation for referencing a location containing supplemental content. For programs with no corresponding supplemental content, the target specifications data field 58 is left empty. However, for those programs with supplemental content, the target specification to the target resource containing the supplemental content is entered in the data field 58 and correlated with the program. The correlation is provided through the data structure by the placing the target specification within the same data record as the program title and other information for a particular program. It is further noted that the target resources can be embedded within other text-based data held in other data fields 50 which also relate to the corresponding programs.

The same or a subset of data structure 48 is employed at the EPG application running at the viewer computing unit in the home. The data records 11 stored at the headend on the EPG server are transmitted periodically in batch, or individually, and cached at the local EPG. The local EPG is thus able to identify whether a particular program is interactive compatible by quick reference to the locally cached EPG data structure.

Figure 4:
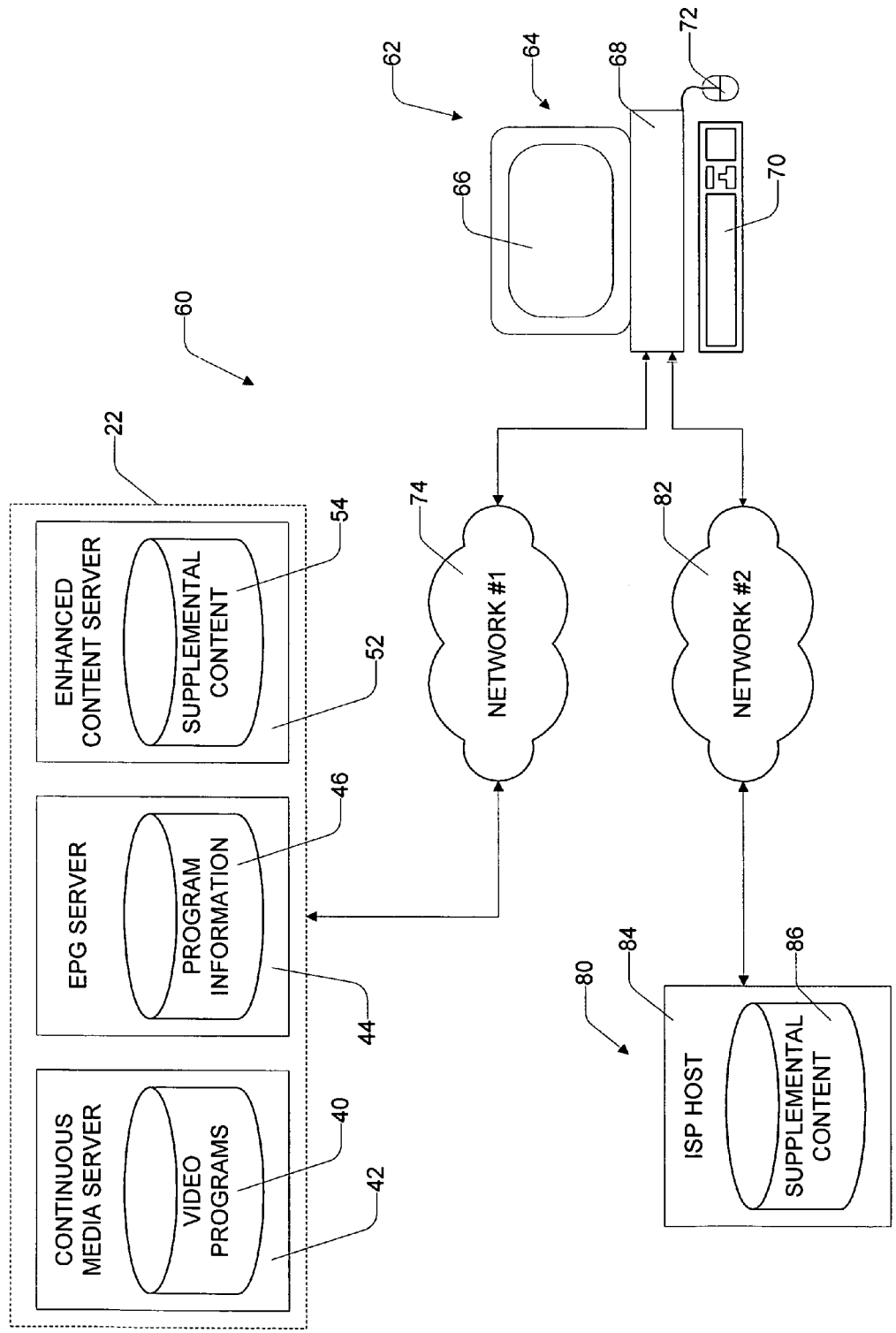
FIG. 4 is a diagrammatic illustration of an interactive entertainment system according to a second implementation, which is representative of an interactive integrated PC-TV system.

FIG. 4 shows an interactive entertainment system 60 according to a second implementation which accommodates third party independent service providers. Interactive entertainment system 60 includes headend 22 which supplies programs and supplemental content to a viewer computing unit 62. In this implementation, the viewer computing unit 62 is implemented as a computer 64 with a monitor 66, a central processing unit 68, a keyboard 70, and a mouse 72 (although other input devices can be used in addition to, or instead of, the keyboard and mouse).

The headend 22 serves the programs over a first network 74, which may be implemented like the fiber optic distribution structure described above, or as a satellite system or other wireless broadcast system, or as a conventional data network. It is noted that other program providers may be used instead of a headend, such as a broadcast station or an online service provider.

The interactive entertainment system 60 also includes multiple independent service providers (ISPs), as represented by ISP 80, which distribute digital content to the viewer computing unit 62 over a second network 82. An example of the second network 82 is a public network, such as the Internet. The ISP 80 has a host 84 and a content database 86 to serve various multimedia content to the viewer's computer. The ISP host 84 stores one or more target resources that can be rendered by the viewer computing unit 62.

The supplemental content provided by the ISP 80 is correlated with the programs by data structure 48 as described above. As shown in FIG. 3, the data field 58 includes target specifications to supplemental content provided by servers other than the program provider which distributes the show. In the illustrated example, the programs Seinfeld and Star Trek have associated ISP-served content which are located by the hyperlink URLs in corresponding data field 58. It is further noted that a program might have more than one source of supplemental content. The program record for "Star Trek" has two associated target specifications, one that references a target resource at the host computer "www.fox.com" and one that references a target resource at the host computer "iww-w.collections.com."

According to this FIG. 4 arrangement, the viewer computing unit 62 receives a non-interactive, continuous video stream from the headend 22, and supplemental interactive content from either the headend 22 or from an independent service provider 80. The supplemental content might therefore be carried to the viewer's computer over the same channel as the program, over a separate channel, or over a separate connection unrelated to the program channels. The back channel for facilitating interactive control is provided through either network 72 or 82.

In another implementation, the interactive content can be supplied locally by a storage medium, such as a CD-ROM; the storage media not including signals or carrier waves. Suppose, for example, a content developer creates an interactive CD-ROM that can be played along with a particular movie. The supplemental content is accessed via disk reads to the local storage drive, rather than using URLs to target resources over a network. The supplemental content is synchronized with the program using open loop control, such as a start time followed by measurable ticks or by frame count.

Figure 5:
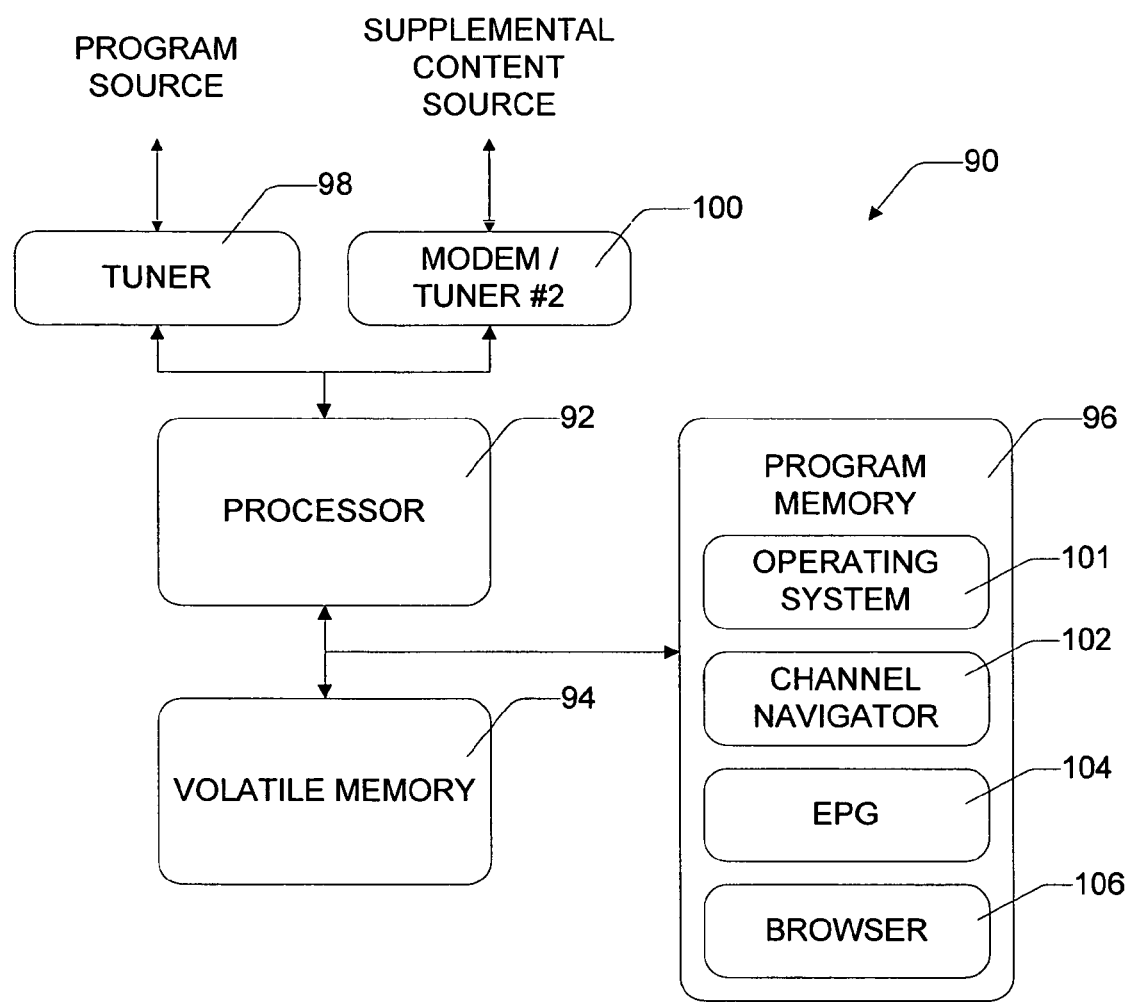
FIG. 5 is a block diagram of a viewer computing unit according to an aspect of this invention.

FIG. 5 shows a viewer computing unit, referenced generally as numeral 90, in more detail. The viewer computing unit 90 includes a processor 92, a volatile memory 94, and a program memory 96. The viewer computing unit 90 also has at least one receiver, and possibly two receivers, for receiving the video stream from the headend and the digital supplemental data from the headend or ISP. The first receiver is in the form of a tuner 98 which tunes to the channel or broadcast frequency to receive a video data stream from a program source, such as the headend, broadcaster, or other program provider. The second receiver, referenced generally as 100, can be implemented as a second tuner for receiving the content over a cable or wireless distribution network, or a modem for receiving the supplemental content over the Internet or other data network.

The viewer computer runs an operating system 101 which supports multiple applications. The operating system 101 is stored in memory and executes on the processor. The operating system is preferably a multitasking operating system which allows simultaneous execution of multiple applications. The operating system 101 employs a graphical user interface windowing environment which presents the applications or documents in specially delineated areas of the display screen called "windows." One preferred operating system is a Windows® brand operating system sold by Microsoft Corporation, such as Windows® 95 or Windows® NT or other derivative versions of Windows®. However, other operating systems which provide windowing environments may be employed, such as the Macintosh operating system from Apple Corporation and the OS/2 operating system from IBM.

A channel navigator application 102 is stored in program memory 96 and executes on the processor 92 to control the tuners 98 and 100 to select a desired channel for receiving the video content programs. An EPG application 104 is stored in program memory 96 and executes on the processor 92 to organize programming information downloaded from the EPG server at the headend. The EPG 104 supports a displayable user interface (UI) which visually correlates programs titles to scheduled viewing times and tuning information, such as a channel, in a scrollable grid format. The viewer computing unit 90 also has an interactive support module in the form of browser 106 which is kept in memory 96. The browser 106 is dynamically loaded on processor 92 when needed to render content, such as a hypertext document, from an ISP or other content provider. The browser can be implemented as a hyperlink browser, or more particularly, as an Internet Web browser.

Although not shown, the viewer computer might also include on or more storage drives, such as a CD-ROM drive, to play interactive CD-ROMs in the event that supplemental data is supplied locally on disk.

Figure 6:
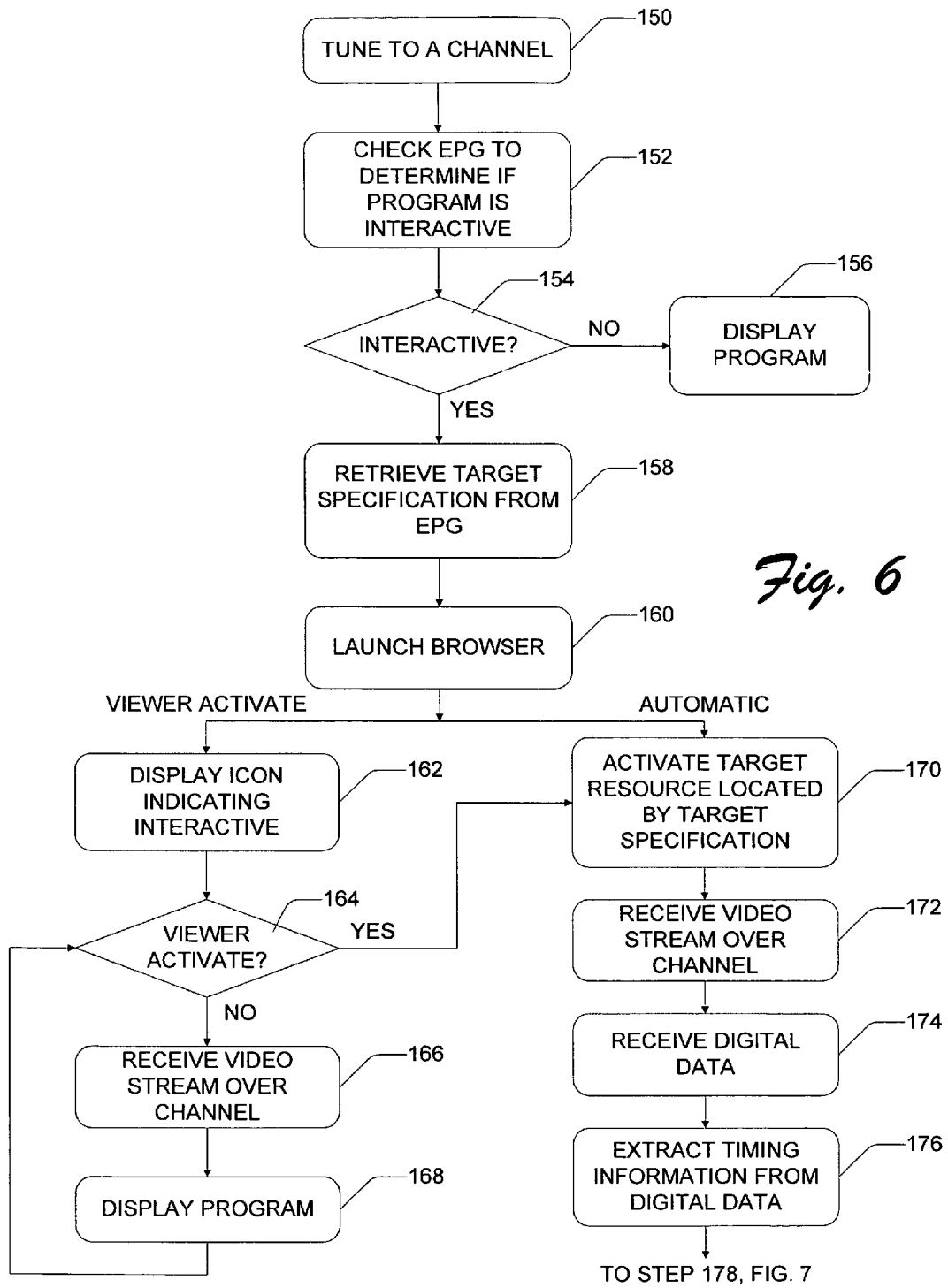
FIGS. 6 and 7 show a flow chart for operating an interactive entertainment system.
Figure 7:
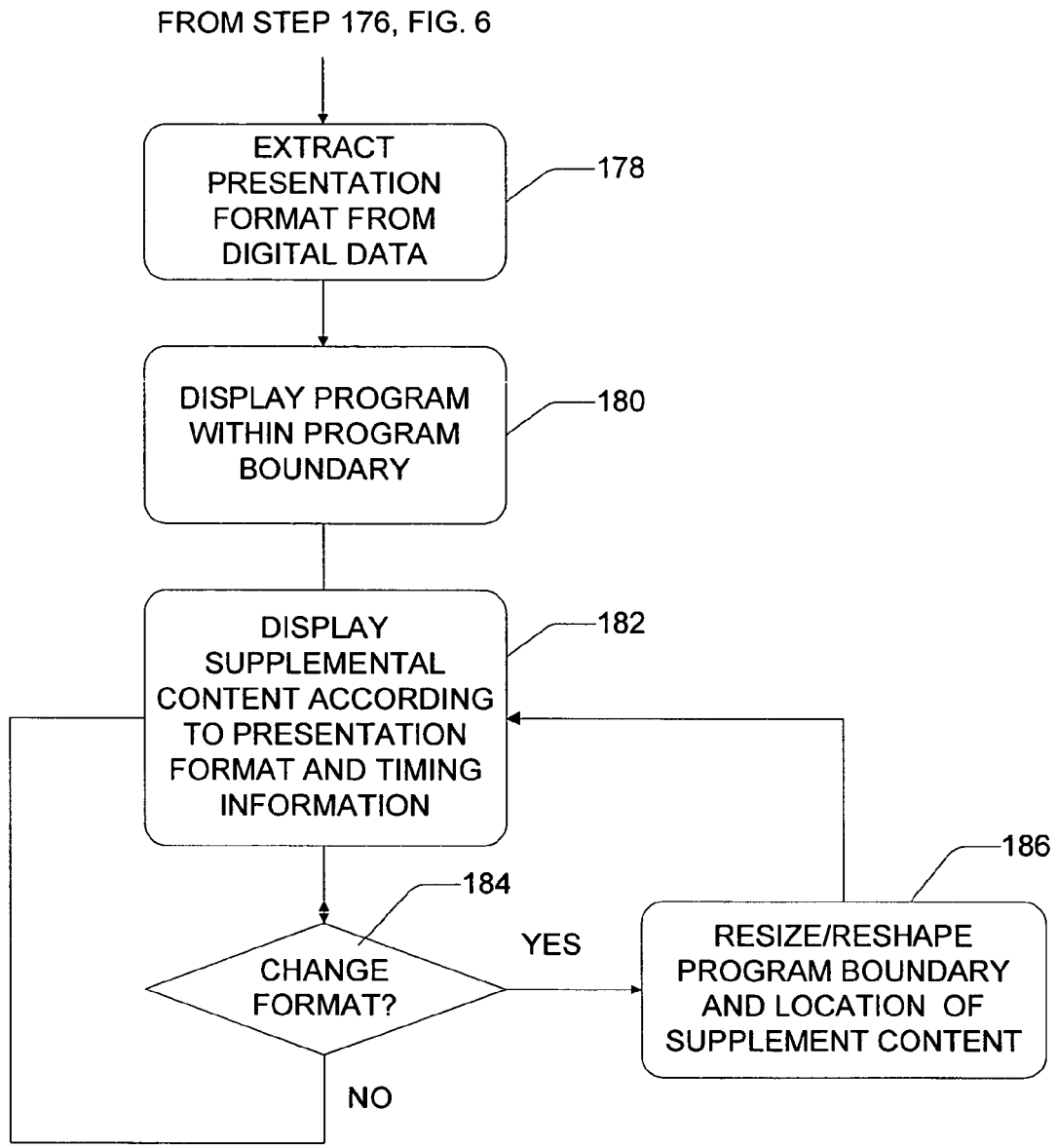

FIGS. 6 and 7 show a method for operating an interactive entertainment system to enhance a conventional continuous video data stream, such as a television show, with interactive supplemental content. This method is described with additional reference to the screen displays shown in FIGS. 8a-8c.

The method begins when a viewer tunes to a particular channel (step 150 in FIG. 6). The channel navigator 102 controls the tuner 98 to tune to the channel. The viewer computing unit checks the appropriate channel and time slot of the EPG data structure 48 to determine if the program being carried on the selected channel at this time is interactive (step 152). As described above, the presence of a target specification in the EPG data field 58 in association with the program is in indication that the program is interactive compatible and that there is supplemental content for the program. If the data field is empty, indicating that no supplemental content exists (i.e., the "no" branch from step 154), the viewer computing unit simply displays the video data stream being received through the tuner 98 (step 156).

A run-time technique can alternatively be used for detecting whether a program is interactive compatible. Rather than checking the EPG data field, the viewer computing unit checks a dedicated channel for the existence of new 19 supplemental content data. The dedicated channel is separate from the selected channel carrying the program so that the supplemental content is received by the viewer computing unit currently with the program video data. The existence of a supplemental content data stream over the dedicated channel indicates that the program being received on the selected channel is interactive compatible. This technique can be carried out without reference to the EPG listing.

If the program is interactive compatible (i.e., the "yes" branch from step 154), the viewer computing unit retrieves the target specification from the EPG data structure (step 158 in FIG. 6). The target specification might be a pointer to a memory location at the headend, or a pointer to a memory location on a locally running CD-ROM, or a hyperlink to a target resource located at an independent service provider. The hyperlink browser 106 is loaded onto the processor to render the target resource referenced by the target specification (step 160).

At this point, there are several ways to initiate viewing the supplemental content. One approach is to permit the viewer to selectively activate the interactive mode (i.e., the "viewer activate" branch from step 160). The viewer may know that the program is interactive compatible by checking a newspaper listing or other program guide. Another way is to have the viewer computing unit display an icon or other indicia on the screen to visually inform the viewer that the program is interactive compatible (step 162 in FIG. 6). The icon can be overlaid on the playing video program in an non-conspicuous manner, like the closed caption or stereo labels.

Figure 8A:
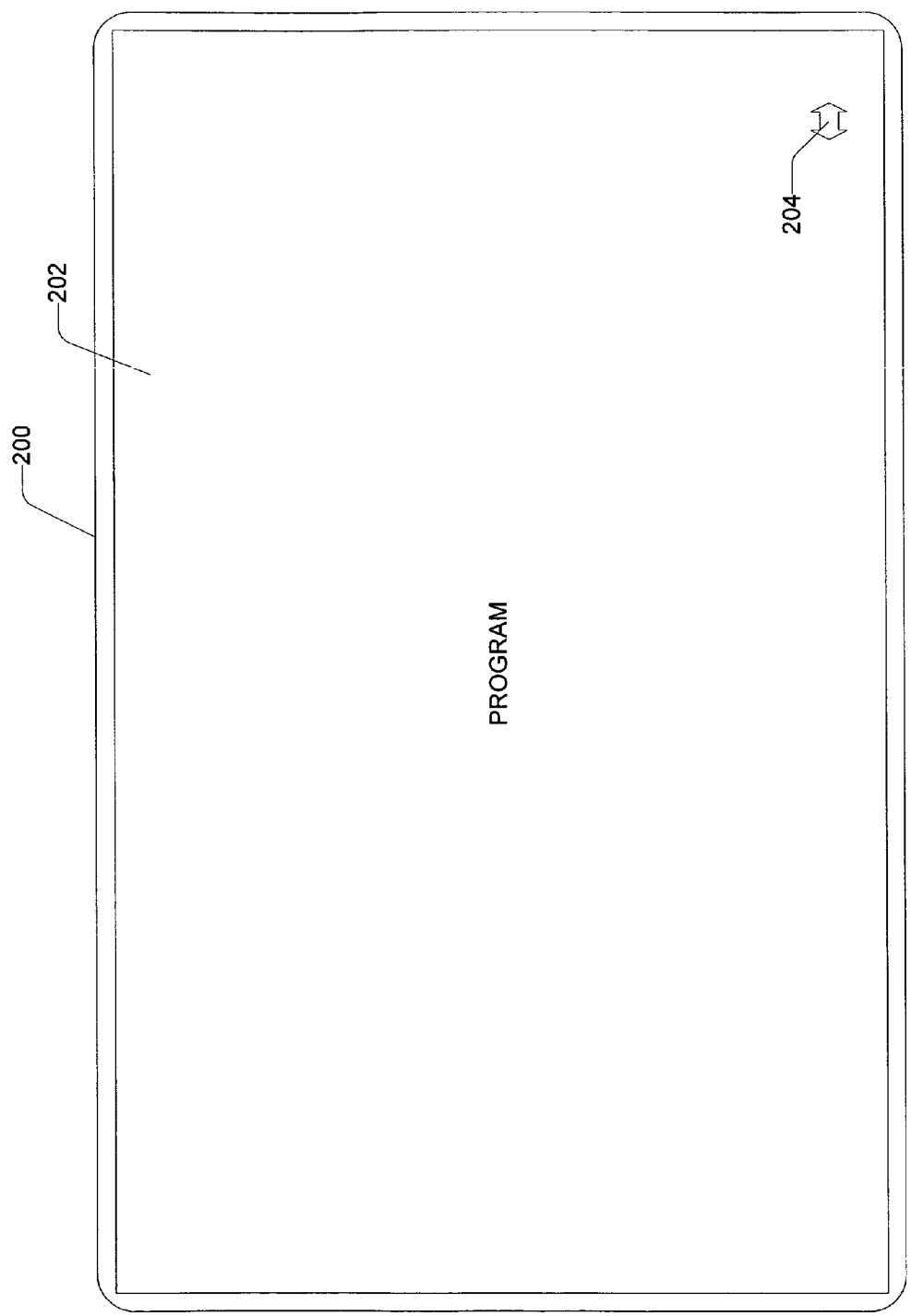
FIG. 8a-8c are a series of exemplary screen illustrations showing different display layouts of the video program and the supplemental content.

FIG. 8a shows an example screen 200 having a video program 202 playing at full-size on the screen. An icon 204 is displayed at the lower right corner of the screen to inform the viewer that the program 202 is interactive compatible. The icon 204 can be displayed throughout the program, or faded out after a set time period. This initial screen represents a first mode of interactivity, where the viewer is presented with the choice of interactive entertainment or non-interactive viewing of the program. As long as the viewer does not activate the icon 204, the viewer computing unit continues to receive the video content program over the selected channel and display that program alone, without any supplemental content (steps 166 and 168 in FIG. 6).

If the viewer decides to enter into an interactive mode, the viewer employs a remote control handset, mouse, keyboard, or other mechanism to actuate the icon 204. This causes the browser 106 to start the target resource located by the target specification listed in the EPG data structure (step 170 via the "yes" branch from step 164).

This leads to another approach to invoking the supplemental content. Rather than displaying an icon and waiting for input from the viewer, the viewer computing unit can automatically activate the target resource as soon as the browser is loaded on the processor (step 170 from the "automatic" branch from step 160).

The target resource contains digital data which supports interactive functionality in conjunction with the associated video content program. The digital data defines the supplemental content to enable viewer interactivity with the video content program. The digital data also defines a display layout prescribing how the supplemental content and the video program are to appear in relation to one another when displayed on the screen.

The digital data further defines timing information to synchronize presentation of the supplemental content with the video content program. This timing information can be implemented in many different ways. One approach is to coordinate the supplemental content to a particular program start time, and then carefully measure time from that start time to synchronize presentation of the supplemental content with the appropriate points in the program. Another approach is to characterize the program in terms of frames, and key the introduction of supplemental content to the frame numbers.

The video stream and supplemental content can be transmitted together, as a single signal, or separately. In the former implementation, the digital data is packaged with the video stream and transmitted as one signal from the headend. The viewer computing unit receives the single signal at tuner 98 and separates the digital data from the video signal (steps 172 and 174). In the latter implementation, the video data stream is received over the selected channel via tuner 98 from the program provider (step 172). The digital data is received from the target resource that is activated by the browser (step 174). This target resource might be located at the headend, in which case, the data is received over a separate channel using tuner 100; or the target resource might be served by an independent service provider, in which case, the data is received over a public network using the modem 100.

At the viewer computing unit, the digital data is deconstructed to extract the timing information and the display layout from the supplemental content (step 176 in FIG. 6 and step 178 in FIG. 7). The display layout defines a program boundary within which the program is displayed to the viewer. The program boundary is sized and shaped according to parameters prescribed in the display layout. As the size and shape changes, the processor scales the video data for display within the program boundary at that instance (step 180 in FIG. 7).

The display layout also defines how the supplemental content is illustrated along with the program. The display layout prescribes the size, style, location, and other parameters for presenting the supplemental content. For instance, the supplemental content might be at least partly overlaid on the video program, or provided as a wrapper around, or along side, the program. The supplemental content is displayed according to this display layout and synchronized to the program according to the timing information (step 182 in FIG. 7). As an example, the supplemental content might be a trivia game which quizzes the viewer as to possible outcomes of various scenes. The questions are displayed on the screen according to the display layout and are timed using the timing information to coincide with the part of the program to which the questions pertain.

Figure 8B:
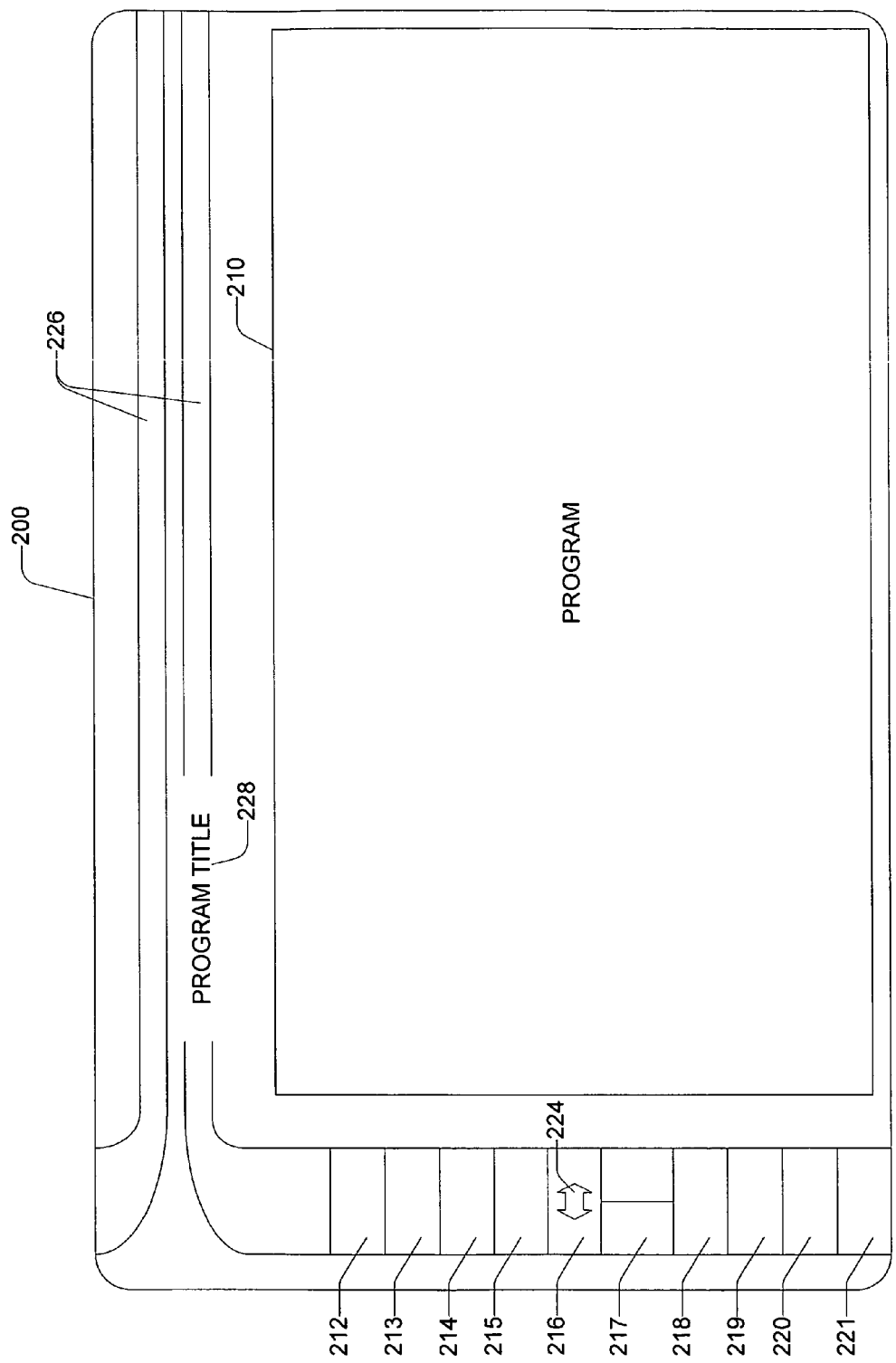

FIG. 8b illustrates a screen 200 that is part of the interactive mode. Here, the video program is constrained within a program boundary 210 which is less than full-screen size. The program boundary 210 has been reduced in comparison to the full-size presentation of FIG. 8a to make room for the supplemental content. In this illustration, the supplemental content consists of a main menu having soft buttons 212-221, a highlighter or cursor icon 224, graphics bars 226, and a text block 228 to hold the program title. The soft buttons 212-221 present various control options to the viewer to invite interactive involvement with the program.

The illustrated screen is taken from an interactive program based on a Star Trek episode. To provide an example of the main menu, the soft buttons 212-216 represent actions for calling up related TV shows and movies. For instance, button 212 relates to the original Star Trek series; button 213 concerns The Next Generation series; button 214 represents the Deep Space Nine series; button 215 represents the Voyager series; and button 216 relates to the various motion pictures.

Figure 8C:
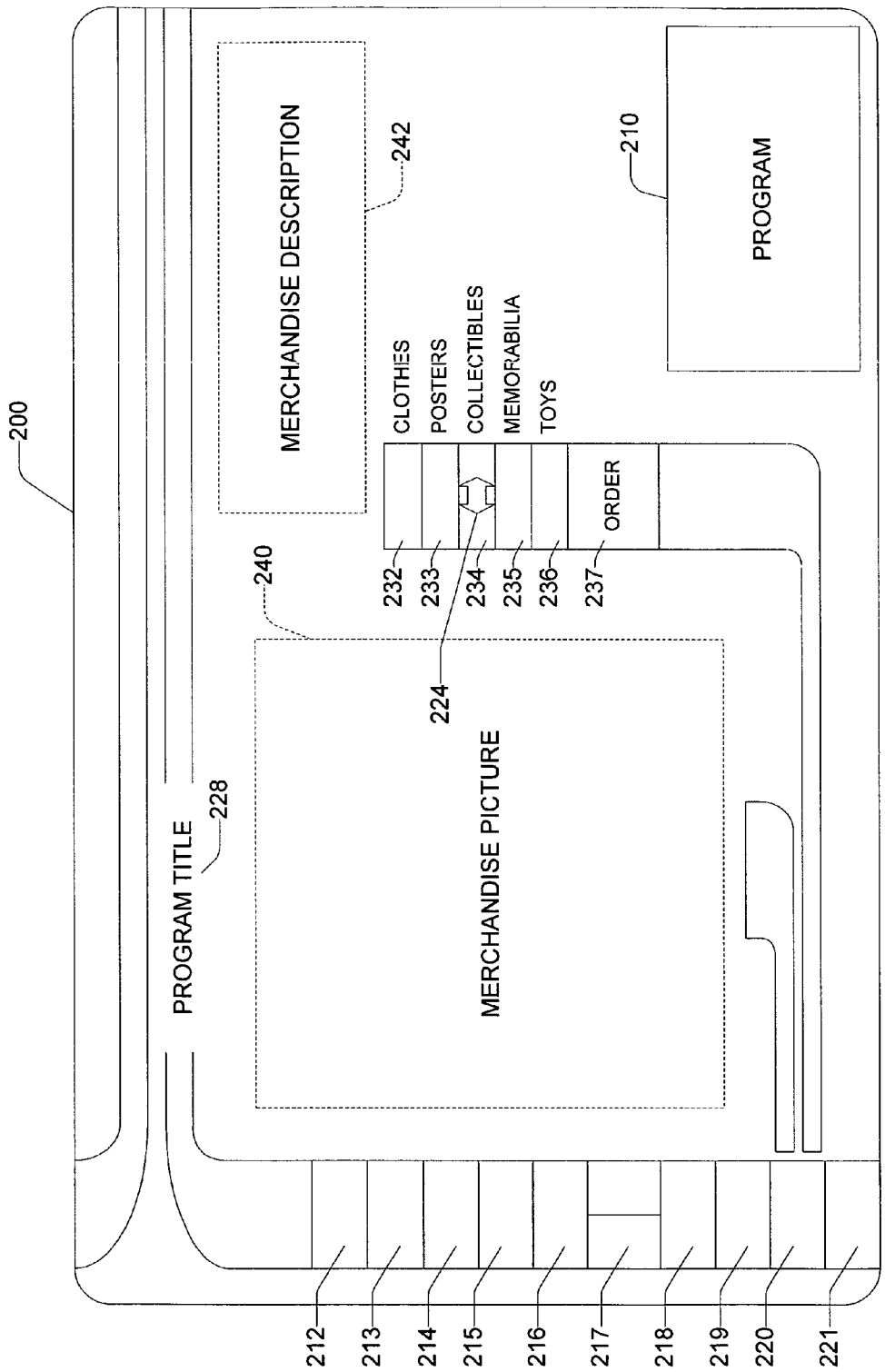

Soft button 217 is an access/classified toggle which allows selection of one of two levels of interactivity. "Access" serves as a default mode of interactivity which contains the main menu functionality. The screen of FIG. 8b is an example of the access mode of interactivity. A voice-over narrative announces the mode when selected by button 217. Once in the access mode, the broadcast video stream is shrunk to fit within the smaller program boundary 210 to accommodate the main menu graphics. The alternate mode of interactivity, or "classified" mode, contains time-linked contextual information to provide a second tier of information. FIG. 8c, shown below, is an example of the classified mode of interactivity.

Soft buttons 218-220 enable selection of different types of supplemental content. Button 218 relates to an encyclopedia containing numerous facts and information about the program. In the Star Trek program, for example, the encyclopedia might contain information on aliens, behind-the-scenes tidbits, cast and crew biographies, facts on other episodes, interviews with the actors/actresses, a technical manual explaining intricacies of starship operation and travel, and various timelines.

Button 219 is associated with a program guide, which provides a listing of current Star Trek shows for a two week period. The program guide also permits the user to change channels to another channel carrying a Star Trek show, if available.

Button 220 allows selection of entertainment content, which includes trivia games related to the program and a merchandise catalog. The trivia games segment allows viewers to compete against other regional competitors. The catalog lists available merchandise related to the program that can be purchased by the viewer.

The tenth button 221 is a quit button which allows the viewer to leave the interactive mode and return to a full-screen display, as shown in FIG. 8a.

The program and supplemental content are displayed as prescribed by the display layout. The digital data from the target resource, however, can dynamically change the display layout. When the display layout is changed (i.e., the "yes" branch from step 184), the viewer computing unit re-sizes and/or reshapes the program boundary 210 and location of the supplemental content to achieve the presentation envisioned by the content developer (step 186). The display layout can be changed for various reasons. The display layout might change in response to viewer selection of a soft button, as is the case causing the display layout change between FIGS. 8b and 8c. The display layout might also be altered automatically as part of the timing information. For instance, the digital data might invoke a graphic or text to pop up on the screen at a timely point in the program. Such real-time content includes, for example, trivia questions, interesting facts, graphical or sound effects, and so forth that relate to specific parts of the program.

FIG. 8c shows the screen 200 at another instance after the viewer has selected soft button 220 to enter into a classified mode of interactivity. The main menu is still present on the screen, but more contextual information is added in a graphical format to represent an extension of the selected soft button 220. The program boundary 210 is further reduced to accommodate the additional graphical and textual information.

In this illustration, the viewer has selected the entertainment button 220 to display the merchandise store. This layout places the video program box 210 in the lower right hand corner of the screen, and leaves the remaining area of the screen to be used for supplemental content. The supplemental content comprises a secondary menu having actuatable soft buttons 232-237. The cursor symbol 224 is movable among the various buttons and used to activate a selected button. The buttons correspond to various types of merchandise, such as clothes, posters, collectibles, memorabilia, and toys. There is also an order button 237 that permits the user to place an order for a particular product. A picture window 240 is arranged beside the secondary menu to show a picture of the merchandise associated with the category indicated by the cursor symbol 224. A merchandise description window 242 contains a brief description of the merchandise shown in the picture window 240.

The system and method for presenting interactive entertainment programs is advantageous as it returns the freedom of creativity to the content developer. By embedding the display layout instructions within the digital data provided by a target resource, the developer is empowered to create both the content and the presentation format of how the content and broadcast program are displayed to the viewer. The developer is free to control the location and shape of the broadcast program window, as well as the presentation format of the supplemental content relative to the program window. This facilitates a non-restrictive environment in which the developer can create screens with optimal appeal to the viewer. No longer is the developer simply developing content to be displayed within a fixed pane that cannot be dynamically altered relative to the program.

Figure 9:
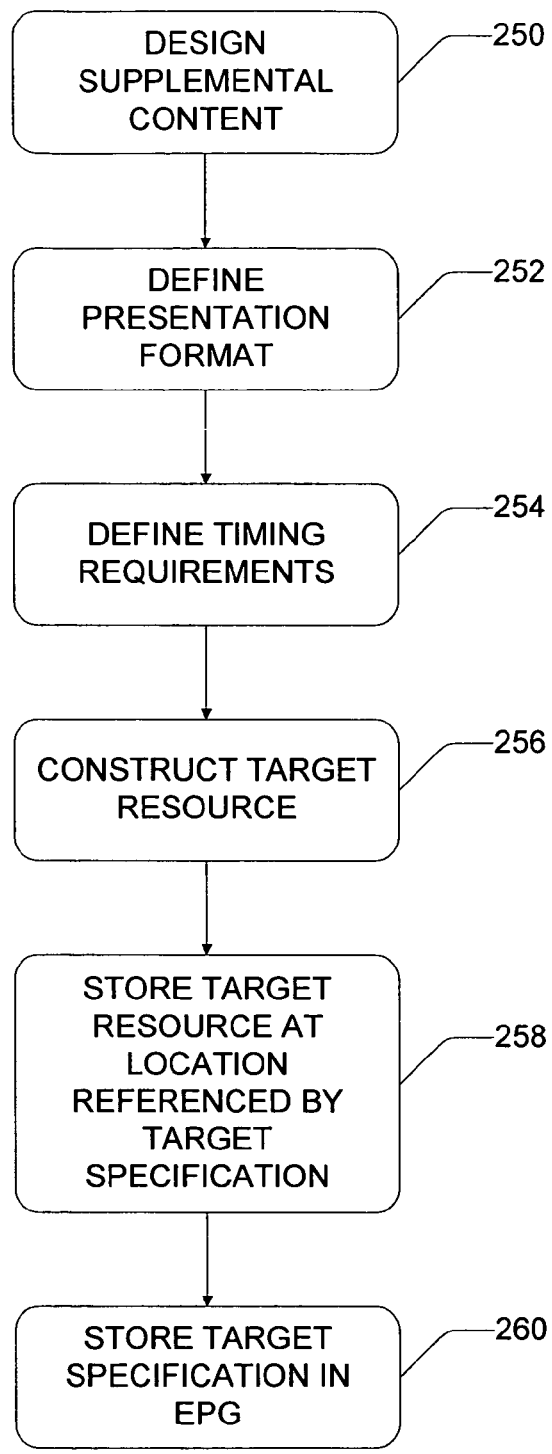
FIG. 9 is a flow chart of a method for authoring an interactive entertainment program.

The creative power is thus placed in the hands of the target resource author. FIG. 9 shows a method for authoring an interactive entertainment program. The author begins by developing the supplemental content which is to accompany a particular television show or movie (step 250 in FIG. 9). The author designs the presentation format for each scene of the program (step 252), and the timing requirements for synchronizing the supplemental content with the broadcast video stream (step 254).

In the implementation described herein, the supplemental content is constructed as a hypertext document which can be rendered by a browser. To control how the content is to be rendered, the author encodes the presentation format and timing instructions as extension attributes to hyperlink codes. More specifically, hypermedia content utilized by the WWW is commonly written using what is referred to as a "markup language." "SGML" (Standard Generalized Markup Language) is one such language, defined formally as "a language for document representation that formalizes markup and frees it of system and processing dependencies." SGML is a language for describing the structure of documents and for describing a tagging scheme to delineate that structure within text. For creating hypermedia content, WWW documents utilize a subset of SGML called "HTML" (Hypertext Markup Language). An HTML textual document can be thought of as plain text that contains formatting instructions in the form of HTML markup codes or "tags." Tags tell Web browsers how to render and print documents, and are also used to specify hyperlinks.

The following is a simple example of a start tag for an HTML hyperlink:

<A HREF="http://www.microsoft.com/upgrades">

The leading "A" in the start tag is the name of HTML element. The letter "A" indicates that the tag is an "anchor" tag—the type of tag that defines a hyperlink. The start tag contains an "attribute" indicating a target specification:

HREF="http://www.microsoft.com/upgrades".

The attribute name is "HREF" and the attribute value is "http://www.microsoft.com/upgrades." HTML documents are organized according to various tags. Tags define the start and end of headings, paragraphs, lists, character highlighting and links, and so on.

The interactive entertainment system described herein supports conventional HTML documents as target resources. Accordingly, authors can use familiar HTML elements, such as Head, Body, and Character-Level elements, to construct a target resource. However, the inventors have also developed new types of tags, as well as extension attributes to existing HTML tags. The author of a target resource can use the new tags and extension attributes to formulate how and when the browser renders the supplemental content along with the continuous video stream. The new HTML extension attributes are given below in Table 1.

TABLE 1

HTML Extension Attributes

| HTML Tag | Extension Attribute | Function |
|---|---|---|
| BODY | background | Specifies a URL for an image tile or MMS stream to cover the document background to yield a distinctive appearance. |
| IMG | dynsrc | Specifies the address of a video clip or broadcast source to be displayed. |
| FRAMESET | usedefault | Used to determine where the focus is located in a tab-based user interface within a FRAME by specifying the URL for the file containing the map, followed by a '#', followed by the name of the USEDEFAULT. If the argument to USEDEFAULT starts with a '#', the map is assumed to be in the same document as the USEDEFAULT tag |

The new tags supported by the interactive entertainment system are provided in Table 2.

TABLE 2

HTML Tags

| HTML Tag | Function | Permitted Attributes |
|---|---|---|
| ACTION | Controls update or display of sound or picture | CELL - identifies object in a GALLERY<br>HREF - URL to resource or object<br>ID - label or id for this element<br>TARGET - where to perform action such as a FRAME or RENDERIMAGE element |
| EVENT | Associates trigger and action | TRIGGER - reference to TRIGGER element to be used with this event<br>ACTION - reference to TRIGGER element to be used with this event - allow comment delimited list of actions to satisfy the need for multiple actions in response to a single trigger |
| GALLERY | Stores and coordinates collection of images | ID - name of event<br>SOURCE - URL to actual graphic<br>ID - name of gallery<br>ROWS - height of each graphic cell<br>COLUMNS - width of each graphic cell<br>TRANSPARENCY - RGB value indicating background color |
| LOADFONT | Downloads and installs a font to be used | HREF - URL to font resource |
| RENDERIMAGE | Displays an image from the GALLERY | REF - name of GALLERY<br>CELL - specifies individual cells containing image |
| TRANSITION | Defines screen change interim, fade to black, cut, and so on. | TYPE - type of transition<br>SPEED - how fast does the transition occur, SLOWEST, SLOW, MEDIUM, FAST, FASTEST |
| TRIGGER | Defines when something is to occur | ID - name of this TRIGGER<br>TIME - time in milliseconds since the last event |

Using the supplemental content and HTML tags for timing and presentation format, the author constructs the target resource (step 256 in FIG. 9). The target resource is stored in a storage medium at a host computer and a target specification for referencing that location is defined (step 258). The author submits the target specification to the authority responsible for developing the programming information maintained in the EPG database. The target specification is stored in the appropriate data field of the EPG data structure which corresponds to the program to which it pertains (step 260).

In compliance with the statute, the invention has been described in language more or less specific as to structure and method features. It is to be understood, however, that the invention is not limited to the specific features described, since the means herein disclosed comprise exemplary forms of putting the invention into effect. The invention is, therefore, claimed in any of its forms or modifications within the proper scope of the appended claims appropriately interpreted in accordance with the doctrine of equivalents and other applicable judicial doctrines.

The invention claimed is:

1. A method for creating a data structure in a storage medium that is used to organize programming information, the method comprising:
    forming data fields in the storage medium to hold programming information pertaining to a video content program, some of the data fields holding text-based data;
    adding a target specification which references a target resource containing data that supports interactive functionality with respect to the video content program by forming a separate data field to hold the target specification for the video content program, the target resource comprising:
        a definition of supplemental content, including:
            an extension attribute "background" for use with an HTML tag "BODY" to specify a URL for an image tile;
            an extension attribute "dynsrc" for use with an HTML tag "IMG" to specify an address of a video clip;

an extension attribute "usedefault" for use with an HTML tag "FRAMESET" to determine where a focus is located in a user interface;

an HTML tag "ACTION" to control update or display of sound or picture;

an HTML tag "TRIGGER" to define when events of the HTML tag "ACTION" are to occur; and an HTML tag "EVENT" to associate the HTML tags "ACTION" and "TRIGGER"; and layout instructions, for processing by a viewer computing unit, that define a display layout prescribing how the supplemental content and the video content program are to appear in relation to one another when displayed; and organizing the data structure to comprise the data fields, the data structure being periodically broadcasted to the viewer computing unit.

2. A method as recited in claim 1, wherein the target specification is a pointer to a memory location at a headend.

3. A method as recited in claim 1, wherein the target specification is a pointer to a local memory location.

4. A method as recited in claim 1, wherein the target specification is a hyperlink to the target resource located at an independent service provider over a network.

5. A computer programmed to perform the steps recited in claim 1.

6. A method as recited in claim 1, wherein the target specification is configured to cause dynamic launching of an Internet browser for activating the target resource.

7. A method as recited in claim 1, further comprising adding another target specification which references another target resource containing data that supports interactive functionality with respect to various ones of the video content program by embedding the other target specification within the text-based data held in another data field.

8. A method for creating a data structure in a storage medium that is used to organize programming information, the method comprising:

forming data fields in a storage medium to hold programming information pertaining to video content programs, some of the data fields holding text-based data, the video content programs comprising broadcasted video content programs; and adding a target specification which references a target resource containing target resource data that defines supplemental content that supports interactive functionality with respect to various ones of the video content programs by embedding the target specification within the text-based data held in a data field, the interactive functionality comprising responsiveness to user input through an electronic programming guide (EPG) allowing selection from among plural uniform resource locators (URLs) to provide the supplemental content, the target resource data further defining layout instructions for processing by a viewer computing unit that define a display layout of the supplemental content along with an associated broadcasted video content program, the layout instructions including instructions to change location, shape, and relative sizing of a program boundary of a video content program and a boundary of the supplemental content based on time elapsed since a start time of the video content program;

adding a definition of supplemental content, including:

an extension attribute "background" for use with an HTML tag "BODY" to specify a URL for an image tile;

an extension attribute "dynsrc" for use with an HTML tag "IMG" to specify an address of a video clip;

an extension attribute "usedefault" for use with an HTML tag "FRAMESET" to determine where a focus is located in a user interface;

an HTML tag "ACTION" to control update or display of sound or picture;

an HTML tag "TRIGGER" to define when events of the HTML tag "ACTION" are to occur; and an HTML tag "EVENT" to associate the HTML tags "ACTION" and "TRIGGER"; and organizing the data structure to comprise the data fields.

9. A method as recited in claim 8, wherein the target specification is a pointer to a memory location at a headend.

10. A method as recited in claim 8, wherein the target specification is a pointer to a local memory location.

11. A method as recited in claim 8, wherein the target specification is a hyperlink to the target resource located at an independent service provider over a network.

12. A method as recited in claim 8, wherein the target specification is configured to cause dynamic launching of an Internet browser for activating the target resource.

13. A method as recited in claim 8, wherein the target specification is configured to cause dynamic launching of an interactive support module for activating the target resource.

14. A method as recited in claim 8, further comprising adding another target specification which references another target resource containing data that supports interactive functionality with respect to various ones of the video content programs by forming another separate data field to hold the other target specification for an associated video content program.

15. A computer programmed to perform the steps recited in claim 8.

16. One or more computer-readable storage media having computer-executable instructions stored thereon that, when executed, direct a computer to perform a method, the method comprising:

forming data fields in a storage medium to hold programming information pertaining to video content programs, some of the data fields holding text-based data, wherein the video content programs are broadcasted in continuous, non-interactive data streams; adding a target specification which:

references a target resource containing data that supports interactive functionality with respect to various ones of the video content programs by at least one of (1) forming a separate data field to hold the target specification for an associated video content program, or (2) embedding the target specification within the text-based data held in a data field; and causes dynamic launching of an Internet browser for activating the target resource, wherein the activating of the target resource causes related supplemental content to be displayed simultaneously with the associated video content program, wherein the target resource data defines layout instructions, including:

an extension attribute "background" for use with an HTML tag "BODY" to specify a URL for an image tile; an extension attribute "dynsrc" for use with an HTML tag "IMG" to specify an address of a video clip; an extension attribute "usedefault" for use with an HTML tag "FRAMESET" to determine where a focus is located in a user interface, wherein the target resource data further defines timing information, to synchronize presentation of the supplemental content with the associated broadcasted video content program; an HTML tag "ACTION" that controls update or display of sound or pictures; an HTML tag "EVENT" that associates a trigger and an action; an HTML tag "GALLERY" that stores and coordinates collection of images, an HTML tag "LOADFONT" that downloads and installs a font; an HTML tag "RENDERIMAGE" that displays an image associated with GALLERY; an HTML tag "TRANSITION" that defines screen change interim, fade to black and cut; and an HTML tag "TRIGGER" to define when events of the HTML tag "ACTION" are to occur;

organizing a data structure to comprise the data fields; and
periodically broadcasting the data structure to the viewer computing unit.

17. The one or more computer-readable storage media as recited in claim 16, wherein the target specification is a pointer to a memory location at a headend.

18. The one or more computer-readable storage media as recited in claim 16, wherein the target specification is a pointer to a local memory location.

19. The one or more computer-readable storage media as recited in claim 16, wherein the target specification is a hyperlink to the target resource located at an independent service provider over a network.

* * * * *